(12) United States Patent
Williams

(10) Patent No.: US 6,859,825 B1
(45) Date of Patent: Feb. 22, 2005

(54) SYSTEM AND METHOD ENABLING CONFIGURATION OF PHYSICAL LAYER DEVICES AND CORRESPONDING LINK PARTNERS FOR COMMUNICATING NETWORK DATA VIA A CONFIGURATION SOURCE OR AUTO-NEGOTIATION

(75) Inventor: Robert Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 815 days.

(21) Appl. No.: 09/745,422

(22) Filed: Dec. 26, 2000

Related U.S. Application Data

(60) Provisional application No. 60/173,486, filed on Dec. 29, 1999.

(51) Int. Cl.[7] ............................................. G06F 15/177
(52) U.S. Cl. ...................... 709/220; 709/221; 709/228; 709/250; 340/825
(58) Field of Search ................................ 709/220, 221, 709/250, 228; 340/825

(56) References Cited

U.S. PATENT DOCUMENTS

| | | | | |
|---|---|---|---|---|
| 6,160,436 A | * | 12/2000 | Runaldue ..................... | 327/407 |
| 6,308,205 B1 | * | 10/2001 | Carcerano et al. .......... | 709/221 |
| 6,345,310 B1 | * | 2/2002 | Allison et al. .............. | 709/250 |
| 6,434,620 B1 | * | 8/2002 | Boucher et al. ............. | 709/230 |
| 6,516,352 B1 | * | 2/2003 | Booth et al. ................. | 709/250 |
| 6,628,613 B1 | * | 9/2003 | Joung et al. ................. | 370/230 |
| 6,704,280 B1 | * | 3/2004 | Mangin et al. ............. | 370/230 |
| 2001/0038674 A1 | * | 11/2001 | Trans .......................... | 375/355 |

OTHER PUBLICATIONS

The Authoritative Dictionary of IEEE standards terms, IEEE, 7th Edition, 1309–1310.*

* cited by examiner

*Primary Examiner*—Kim Huynh
*Assistant Examiner*—Angel L. Casiano

(57) ABSTRACT

A network interface configures a plurality of physical layer devices and a corresponding plurality of network interface devices to allow for the communication of network data between the physical layer devices and corresponding link partners. At least one of the network interface devices is configured as a master device that communicates management information and autonegotiation results with the physical layer devices, while the other network interface devices do not. A configuration source, such as a central processing unit (CPU) or electronic erasable programmable read only memory (EEPROM), receives the autonegotiation results from the physical layer devices, through the master device, and configures the media access controllers (MACs) of each of the network interface devices in accordance with the autonegotiation results. This forces the MACs into their respective proper configurations even though the network interface devices that are not master devices do not receive the autonegotiation results directly from their corresponding physical layer devices.

15 Claims, 4 Drawing Sheets

SYSTEM AND METHOD ENABLING CONFIGURATION OF PHYSICAL LAYER DEVICES AND CORRESPONDING LINK PARTNERS FOR COMMUNICATING NETWORK DATA VIA A CONFIGURATION SOURCE OR AUTO-NEGOTIATION

RELATED APPLICATIONS

This application claims priority from Provisional Application Ser. No. 60/173,486 filed on Dec. 29, 1999 entitled: "FORCE BITS FOR MAC CONFIGURATION", the entire disclosure of which is hereby incorporated by reference herein.

FIELD OF THE INVENTION

The present invention relates to a local area network interface for a multiple port device, more particularly to an arrangement for configuring physical layer devices of the multiple port devices in order to communicate network data between each physical layer device and corresponding link partners.

BACKGROUND ART

Local area networks use a network cable or other network media to link nodes (e.g., workstations, routers and switches) to the network. Each local area network architecture uses a media access control (MAC) enabling network interface device (NID) at each network node to share access to the media.

Traditional Ethernet networks (10BASE-T) operate at 10 Mb/s Ethernet protocol, as described by IEEE Standard 802.3; the majority of Ethernet interfaces currently operate at this data rate. However, a newer Ethernet standard, under IEEE standard 802.3 u, accomplishes the faster operation of 100 BASE-T systems, at a 100 Mb/s data rate (i.e., a 125 Mb/s encoded bit rate) using unshielded twisted pair (UTP) physical media. The 100 BASE-T standard defines operation over two pairs of category 5 UTP (100 BASE-TX) and over four pairs of category 3 UTP. The 100 BASE-FX network medium, covered by the 100 BASE-T standard, allows operation over dual fiber optic cabling.

Physical (PHY) layer devices are used to enable the MAC to send and receive digital packet data across an interface that is generic to the different media standards. In particular, PHY devices are configured for translating digital packet data received from a MAC across a standardized interface, e.g., a Media Independent Interface (MII), into an analog signal for transmission on the network medium, and reception of analog signals transmitted from a remote node via the network medium. Hence, the MII connects the MAC to a physical layer (PHY) transceiver configured for a particular network medium, e.g., 10 BASE-T, 100 BASE-FX, or 100 BASE-TX.

Newer PHY devices are designed to operate at different network speeds, depending on the type of network medium and the capabilities of a link partner at the other end of the network medium. In such a case, each PHY device needs to be configured to a setting that is compatible with the configuration settings of the link partner's PHY device.

Auto-negotiation is performed between PHY devices of link partners. For example, autonegotiation is performed as a link startup procedure between a network switch port (or repeater port) and a workstation linked to the switch port via the network medium each time a link to the switch port is connected, powered on or reset. During auto-negotiation, the two PHY devices of the link partners exchange information about their capabilities, and then the PHYs configure themselves to the best operating mode that is common to them.

Hence, the PHY transceivers of the link partners will typically perform auto-negotiation amongst each other to determine the best common operating mode for transmission and reception of data packets. Additional details regarding auto-negotiation are disclosed in Breyer et al., "Switched and Fast Ethernet: How It Works and How to Use It", Ziff-Davis Press, Emeryville, Calif. (1995), pp. 60–70, and Johnson, "Fast Ethernet: Dawn of a New Network", Prentice-Hall, Inc. (1996), pp. 158–175.

As described above, the PHY transceivers of the link partners perform auto-negotiation amongst each other to determine the best common operating mode. Each PHY transceiver then supplies any necessary capabilities information to the corresponding MAC via a management data input/output (MDIO) serial interface on the MII.

Newer PHY transceivers, such as the commercially-available Am79C875, "NetPHYT™-4 LP Low Power Quad 10/100-TX/FX Ethernet Transceiver" from Advanced Micro Devices, Inc., Sunnyvale, Calif., integrate a plurality of PHY transceivers onto a single semiconductor chip. However, if a PHY transceiver is configured via autonegotiation, only the NID that was involved in the autonegotiation knows of the results and the other NIDs on the chip have no direct method of determining the results of the autonegotiation.

DISCLOSURE OF THE INVENTION

There is a need for a network interface in communication with a plurality of physical layer devices on a single chip to allow the results of autonegotiation to be overridden, and also to configure each MAC to agree with the results of auto-negotiation.

There is also a need for a network interface that is able to communicate auto-negotiation configuration results between a PHY device and its associated NID when there is no direct MDIO connection between the two devices.

There is also a need for a network interface that enables a plurality of physical layer devices and corresponding link partners to be configured for communicating network data by either a configuration source or through auto-negotiation.

There is also a need for a configuration source to configure the speed, type of link, link status, and pause ability of physical layer devices on a single chip.

These and other objects are attained by the present invention, where either autonegotiation or a configuration source configures physical layer devices and corresponding link partners thereby allowing network data to be transmitted and received.

According to one aspect of the present invention, a network interface is provided comprising a plurality of physical layer devices (PHYs), each configured for communicating network data to a link partner according to one of an autonegotiation protocol with the corresponding link partner and prescribed configuration information from a shared management data bus. The network interface includes a plurality of network interface devices (NIDs), each NID respectively corresponding to one of the PHYs, and each NID having a media access controller (MAC), with at least one of the NIDs configured as a master NHD for communicating configuration information between the PHYs and a configuration source. A shared management data bus couples together each of the PHYs and the master NID, the shared management data bus carrying the prescribed configuration information and autonegotiation results. A configuration source is coupled to the NIDs, the configuration source being configured to receive the autonegotiation results from each PHY through the master NID and send MAC configuration information to the MAC in each of the NIDs to configure the MAC of each NID in accordance with the autonegotiation results for the corresponding physical layer device.

Another aspect of the present invention provides a method for configuring network interface devices, comprising the steps of configuring a plurality of physical layer devices (PHYs), each PHY communicating network data to a link partner according to one of an autonegotiation protocol with the corresponding link partner and prescribed configuration information from a shared management data bus. The autonegotiation results from the PHYs based on autonegotiation of the PHYs with their corresponding link partners are received at a configuration source. The individual media access controller (MAC) of each of a plurality of network interface devices (NMDs) is configured by a configuration source based on the autonegotiation results received by the configuration source from the PHYs, each NID corresponding to a respective PHY.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF THE INVENTION

Figure 1:
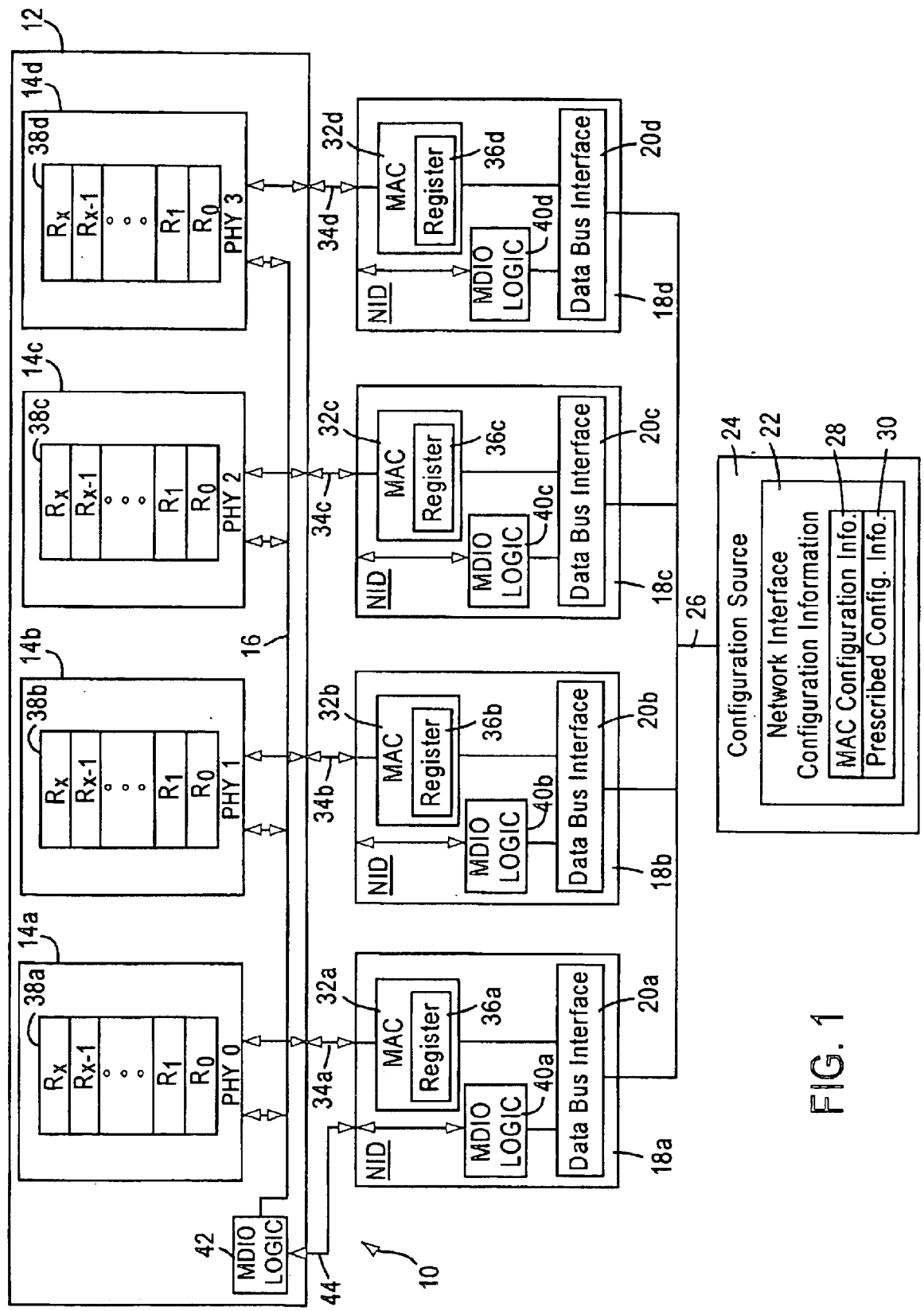
FIG. 1 is a block diagram of an exemplary network interface in an Ethernet ANSI/IEEE 802.3) network according to the preferred embodiment of the present invention.

FIG. 1 is a block diagram of an exemplary network interface 10 in an Ethernet (ANSI/IEEE 802.3) network where the network interface 10 includes a plurality of physical layer devices (PHYs) 14a, 14b, 14c, and 14d. Each of the PHYs 14a, 14b, 14c, and 14d is configured for communicating network data to a link partner (not shown) according to one of an autonegotiation protocol or prescribed configuration information 30 from a shared management data bus 16. A plurality of network interface devices (NIDs) 18a, 18b, 18c, and 18d, each having a data bus interface 20a, 20b, 20c, and 20d, respectively, receive network interface configuration information 22 from a configuration source 24 via a data bus 26. The network interface configuration information 22 comprises media access controller (MAC) configuration information 28 and the prescribed configuration information 30. In addition to the data bus interface 20a, 20b, 20c, and 20d, each NID 18a, 18b, 18c, and 18d includes a media access controller (MAC) 32a, 32b, 32c, and 32d. The MAC configuration information 28 is used to configure the MACs 32a, 32b, 32c, and 32d to transmit and receive the network data across a media independent interface (MII) 34a, 34b, 34c, and 34d, respectively, to a corresponding PHY 14a, 14b, 14c, and 14d, respectively. One of the NIDs 18a, 18b, 18c, and 18d is configured as a master device (18a) for selectively supplying the prescribed configuration information 30, via the shared management data bus 16, to at least one of the PHYs 14a, 14b, 14c, and 14d.

In the preferred embodiment, the configuration source 24 is a central processing unit (CPU) and the data bus 26 is a PCI local bus. In an alternate embodiment, the configuration source 24 is an electronically erasable programmable read only memory (EEPROM) and the data bus 26 is a serial interface. In the alternate embodiment, the EEPROM downloads default network interface configuration information into the network interface devices 18a, 18b, 18c, and 18d and physical layer devices 14a, 14b, 14c, and 14d, respectively.

In an enhanced embodiment, the CPU is able to determine the operating characteristics of the NIDs 18a, 18b, 18c, and 18d and PHYs 14a, 14b, 14c, and 14d and configures each device to improve the performance for the network interface 10. Therefore if the network data error rate changes, the CPU is able to reconfigure the network interface components to improve the performance of the network interface. For example, if too many errors are detected when a network segment is running at 100 Mb/s, the CPU can reconfigure the MAC and corresponding PHY to run at 10 Mb/s.

The data bus interface 20a, 20b, 20c, and 20d, for each NID 18a, 18b, 18c, and 18d, respectively, receives the network interface configuration information 22. Each of the data bus interfaces 20a, 20b, 20c, and 20d, is connected to the MACs 32a, 32b, 32c, and 32d, respectively. Each of the MACs 32a, 32b, 32c, and 32d contains at least one register 36a, 36b, 36c, and 36d, respectively, which is configured to store the MAC configuration data 28. Each media access controller 32a, 32b, 32c, and 32d is configured to transmit and receive the network data according to the MAC configuration data 28.

Each of the NIDs 18a, 18b, 18c, and 18d includes management data input/output (MDIO) logic 40a, 40b, 40c, and 40d, respectively. The prescribed configuration information 30 for configuring the PHY 14a, 14b, 14c, and 14d, is received by all of the NIDs 18a, 18b, 18c, and 18d, respectively. The MDIO logic 40a of the selected or master NID 18a writes the configuration information to the PHY's 14a–d. Hence, the selected or master NID 18a forwards the prescribed configuration information 30 to common MDIO logic 42 via a management data clock/MDIO (MDC/MDIO) signal path 44. The common MDIO logic 42 receives the prescribed configuation information 30 and sends the prescribed configuration information 30 to at least one PHY 14a, 14b, 14c, and 14d.

Sharing the common MDIO logic 42 allows a plurality of PHY's to be incorporated into a single chip 12, e.g., the single quad-PHY device as shown in FIG. 1. Once a PHY 14a, 14b, 14c, and 14d and a NID 18a, 18b, 18c, and 18d are properly configured, network data can be transmitted and received over the MIIs 34a, 34b, 34c and 34d. In addition, each PHY 14a, 14b, 14c, and 14d is then able to transmit and receive network data to and from a network medium (not shown), which in turn allows the NID 18a–d to transmit and receive network data to and from corresponding link partners (not shown).

Figure 2:
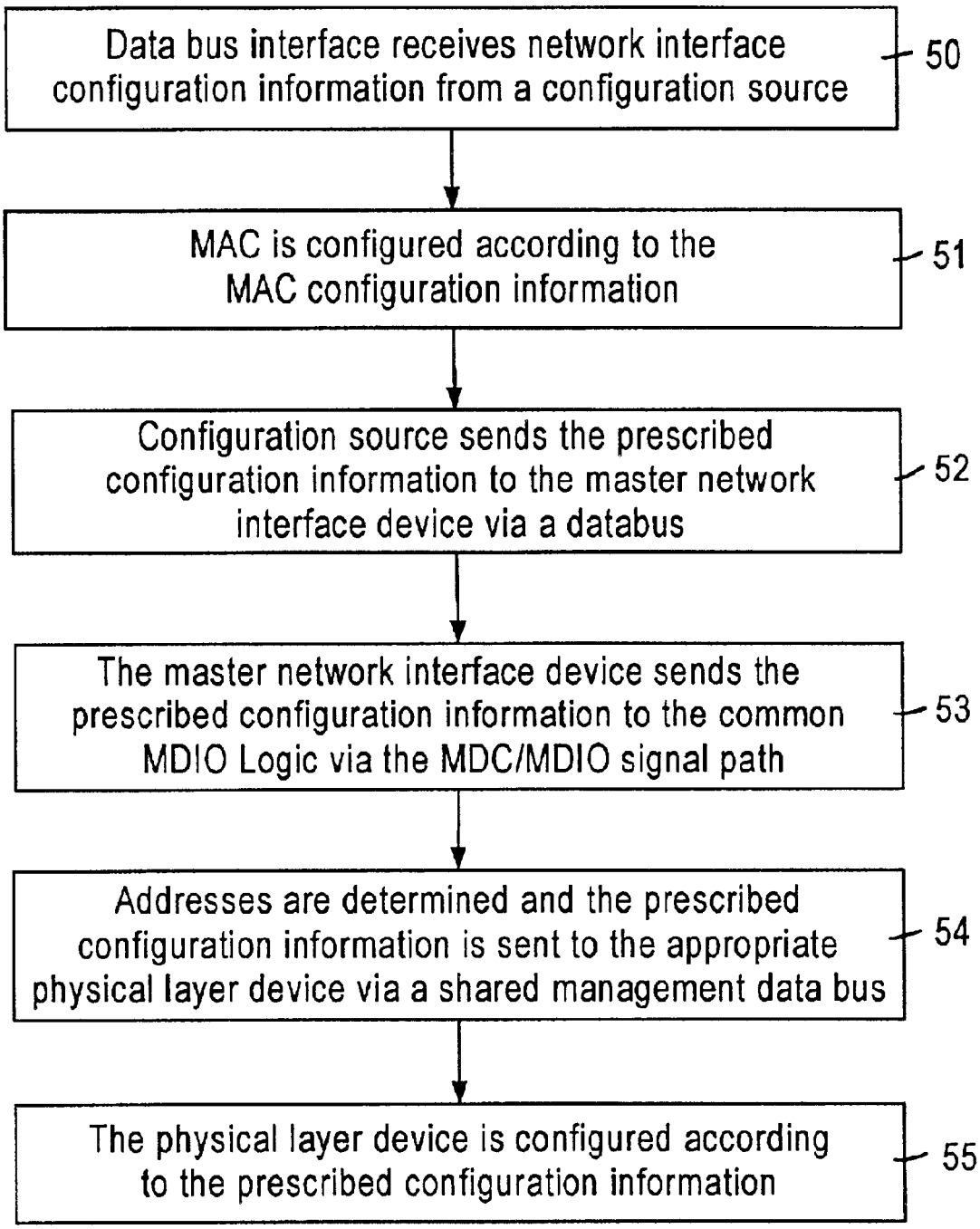
FIG. 2 is a flow diagram illustrating the method for configuring of the physical layer devices and network interface devices in the network interface of FIG. 1.

FIG. 2 illustrates the different steps used to configure the PHYs and NIDs in the network interface. The method for configuring NIDs starts with the data bus interface receiving network interface configuration information from a configuration source via a databus (step 50), where the network interface configuration information comprises the MAC configuration information and the prescribed configuration information. Specifically, the MDIO logic of the NID receives the prescribed configuration information and the MAC receives the MAC configuration information. The MAC is configured according to the received MAC configuration information (step 51). The configuration source 24 sends the prescribed configuration information to a master or selected NID 18a via a data bus 26 (step 52). The prescribed configuration information is sent to common MDIO logic 42 via a MDC/MDIO signal path (step 53). The MDIO logic 42 determines the address for the PHY and the address for the register for the PHY from the prescribed configuration information and then sends the information to the appropriate PHY via a shared management databus 16 (step 54). The PHY reads the prescribed configuration information and configures the PHY accordingly (step 55).

Figure 3:
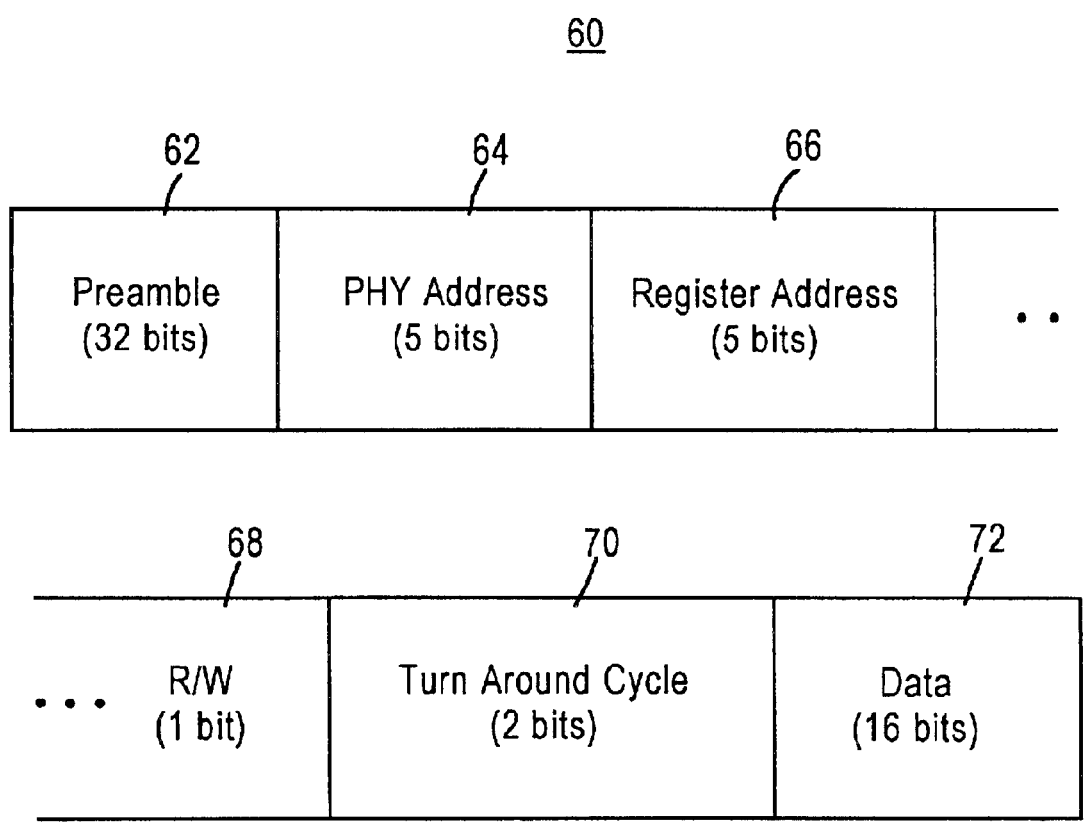
FIG. 3 is a block diagram illustrating the format of an MDIO frame communicated between an MDIO logic block of an NID and the MDIO logic block of a PHY.

FIG. 3 illustrates an example of the format of an MDIO frame communicated between an MDIO logic block of an NID and the MDIO logic block of a PHY. Each of the serial data streams 60 starts with a preamble (32 bits) 62 comprising a known pattern of 1's and 0's. The address of the PHY (5 bits) 64 and the address of the register (5 bits) 66 for the PHY are provided. A control or read/write bit 68 is used to indicate whether the data is to be read or to be written. The turn around cycle (2 bits) 70 is the actual time that is required to reverse the direction of transmission between the PHY and the NID during-half-duplex transmission. The data stream 60 also includes 16 bits of data 72.

As previously mentioned, the configuration parameters can be overridden. The configuration parameters include pause ability, link status and speed control. Pause ability is the ability of the MAC in the NID to respond to a received pause frame. Pause ability is controlled independently from the transmission of pause frames. Therefore, if the pause ability of the MAC is not enabled, the MAC will not react to a pause frame. However, if the pause ability is enabled, the MAC will finish transmitting the current frame and then stop transmitting for the amount of time indicated by the pause frame. Pause ability is enabled by either the negotiate pause ability (NPA) or the force pause ability (FPA) bits. If the FPA bit is set, pause ability is enabled regardless of the pause ability state of the link partner. If the NPA bit is set, after reset the MDIO logic 40 in the NID sends a configuration message over the shared management data bus 16 to the PHY device 14 to cause the PHY device 14 to set its internal pause ability bit. When this bit is set, during the auto-negotiation process the PHY 14 will advertise that the NID is capable of responding to pause frames. Then, if the auto-negotiation results indicate that the link partner is also capable of responding to pause frame, pause ability will be enabled in the MNDs on both ends of the link. If neither NPA nor FPA is set, pause ability is disabled and the auto-negotiation process passes this information to the link partner so that the link partner can also disable pause ability.

The present invention provides a method for configuring each MAC 32a–d to agree with the auto-negotiation results when one or more of the MACs 32a–d are unable to obtain this information directly. This issue arises when more than one MAC 32a–d is connected to a multi-phy device 12, such as that shown in FIG. 1. In order to accomplish this, the MAC devices 32a–d of the present invention are flexible enough to act as either a master MAC with an MDIO interface or a non-master MAC with no MDIO connection. With a multi-PHY device 12 with a single MDIO interface 42, the CPU (configuration source in FIG. 1) 24 sets up all but one MAC (32a, e.g.) so that these other MACs (32b–d, e.g.) are not MDIO masters. This is done by setting a Disable Port Manager bit in each MAC 32b–d that is not an MDIO master. The CPU 24 then uses the MDIO master MAC 32a as a path to the PHYs 14a–d. Through this path, the CPU 24 reads status information from all of the PHYs 14a–d to determine when auto-negotiation is complete. The CPU 24 reads the auto-negotiation results from all the PHYs 14a–d, and then writes the MAC configuration information to the MAC devices 32a–d to configure the MACs 32a–d to be consistent with the PHYs 14a–d.

When the MDIO interface (40a, e.g.) of a NMD (18a, e.g.) is connected to the MDIO interface 42 of a PHY device 14a, the Disable Port Manager bit of MDIO interface 40a is left in its default state, "0". When the Disable Port Manager bit is "0", the MDIO logic 40a in the NID 18a automatically retrieves the auto-negotiation results from the PHY 14a and configures the MAC 32a consistent with these results.

The Pause configuration is handled differently from the speed and duplex mode configuration, since speed and duplex mode are PHY attributes, while pause ability is a MAC feature. Although a MAC feature, the use of the Pause feature is negotiated by the PHYs 14a–d as part of the autonegotiation process. If the CPU 24 wants to enable the PAUSE feature, the CPU 24 uses the MDIO path through the NID 18a–d to set the Pause bit in the auto-negotiation register of the corresponding PHY 14a–d and to set the "Restart Auto-negotiation" bit in the PHY's Control Register. In the case where the NID 18a–d is connected to the PHY 14a–d through the MDIO interface 42, the MDIO logic 40a–d of the NID 18a–d will automatically enable or disable Pause Ability in the NID 18a–d based on the auto-negotiation results. If the NID's MDIO interface 40a–d is not connected, the CPU 24 must retrieve the auto-negotiation result and write to the NID control registers to enable or disable Pause Ability.

To allow the NID 18a–d to act either as an MDIO master or as a device with no MDIO interface, the NIDs 18a–d have the force pause ability and negotiate pause ability control bits described earlier. When the negotiate pause ability bit is set, the MDIO logic causes the Pause bit in the external PHY 14a–d to be set as described above, then enables or disables pause ability in the NID 18a–d based on auto-negotiation results. When the force pause ability bit is set, pause ability in the ND) 18a–d is enabled regardless of auto-negotiation. When both bits are cleared, the MDIO logic 40a–d in the NID 18a–d causes the Pause bit in the external PHY 14a–d to be cleared so that the auto-negotiation process will cause pause ability to be disabled in the NIDs at both ends of the network link.

Speed control can be set to any of the following: determined by the PHY, 1 Mbs, 10 Mbs, 100 Mbs or 1000 Mbs.

Figure 4:
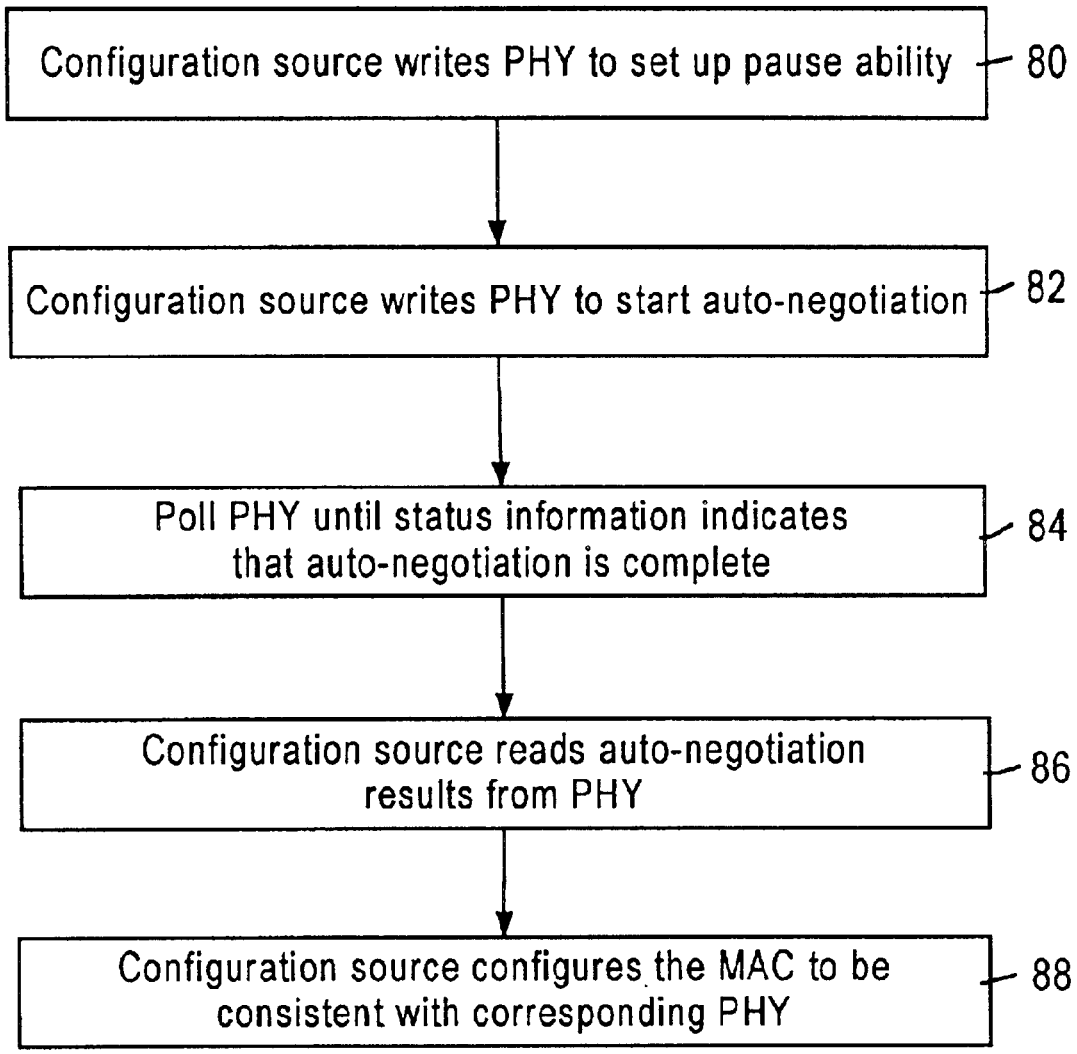
FIG. 4 is a flow diagram illustrating a method for configuring MACs of non-master NIDs in accordance with embodiments of the present invention.

FIG. 4 depicts a basic flow chart of a method of forcing the MACs 32a–d into the appropriate configuration based on the auto-negotiation results, even when one or more of the MACs 32a–d is unable to obtain this information directly. In step 80, the PHYs 14a–d are written to by the configuration source 24 to set up pause ability. The PHYs 14a–d are written to again to start the auto-negotiation process, in step 82. Polling of the PHYs 14a–d takes place until the status information in the PHYs 14a–d indicates that auto-negotiation is finished. The polling takes place in step 84. Upon completion of the auto-negotiation process for a PHY 14a–d, the auto-negotiation results are read from the PHY 14a–d by the configuration source 24, in step 86. The MACs 32a–d are then configured by the configuration source 24 in accordance with the auto-negotiation results for the PHYs 14a–d corresponding to the different respective NIDs, in step 88.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A network interface system comprising:
    a plurality of physical layer devices (PHYs), each configured for communicating network data to a link partner according to one of an autonegotiation protocol with the corresponding link partner and prescribed configuration information from a shared management data bus;
    a plurality of network interface devices (NIDs), each NID respectively corresponding to one of the PHYs, and each NID having a media access controller (MAC), with at least one of the NIDs configured as a master NID for communicating configuration information between the PHYs and a configuration source, the shared management data bus coupling together each of the PHYs and to which the master NID is coupled and carrying the prescribed configuration information and autonegotiation results; and
    a configuration source coupled to the NIDs, the configuration source configured to receive the autonegotiation results from each PHY through the master NID and send MAC configuration information to the MAC in each of the NIDs to configure the MAC of each NID in accordance with the autonegotiation results for the corresponding PHY.

2. The network interface system of claim 1, wherein the plurality of PHYs are incorporated into a single chip.

3. The network interface system of claim 2, further comprising management data input/output (MDIO) logic on the single chip for supplying the prescribed configuration information to a PHY based on address information included with the prescribed configuration information, wherein the MDIO logic is coupled between the shared management data bus and the master NID.

4. The network interface system of claim 3, further comprising a data bus that couples the NIDs to the configuration source, and wherein the configuration source is a central processing unit which provides the prescribed configuration information.

5. The network interface system of claim 3, further comprising a serial interface that couples the NIDs to the configuration source, and wherein the configuration source is an electronically erasable programmable read only memory (EEPROM) configured for storing the prescribed configuration information.

6. The network interface system of claim 3, wherein each MAC further comprises a register configured to store the MAC configuration information.

7. The network interface system of claim 1, wherein the autonegotiation results include pause ability of the link partner of the PHY.

8. The network interface system of claim 1, wherein the MAC configuration information includes pause ability of the MAC.

9. The network interface system of claim 1, wherein the pause ability of the MAC is controlled by a negotiate pause ability (NPA) bit and a force pause ability (FPA) bit in the MAC configuration information, the setting of the FPA bit enabling the pause ability of the MAC regardless of a pause ability state of the link partner of the corresponding PHY of the MAC, the setting of the NPA bit and non-setting of the FPA bit enabling the pause ability of the MAC only if the autonegotiation results indicate that the link partner of the corresponding PHY of the MAC supports pause ability, and non-setting of the NPA bit and the FPA bit disabling the pause ability of the MAC.

10. A method for configuring network interface devices, comprising:
    configuring a plurality of physical layer devices (PHYs), each PHY communicating network data to a link partner according to one of an autonegotiation protocol with the corresponding link partner and prescribed configuration information from a shared management data bus;
    receiving at a configuration source autonegotiation results from the PHYs based on autonegotiation of the PHYs with their corresponding link partners;
    configuring with the configuration source the individual media access controller (MAC) of each of a plurality of network interface devices (NIDs) based on the autonegotiation results received by the configuration source from the PHYs, each NID corresponding to a respective PHY;
    carrying the autonegotiation results and the prescribed configuration information on a shared management data bus that couples together each of the PHYS; and
    configuring at least one of the NIDs as a master NID, coupling the master NID between the shared management data bus and the configuration source, and directing all autonegotiation results and all prsscribed configuration information through the master NID.

11. The method for configuring network interface devices as in claim 10, wherein a plurality of PHYs are incorporated into a single chip.

12. The method for configuring network interface devices as in claim 11, further comprising providing management data input/output (MDIO) logic on the single chip and coupled between the master NID and the shared management data bus, the MDIO logic supplying the prescribed configuration information to a PHY based on address information included with the prescribed configuration information.

13. The method for configuring network interface devices as in claim 12, wherein the prescribed configuration information comprises speed, type of link and pause ability bit settings.

14. The method for configuring network interface devices as in claim 13, wherein the configuring of the MAC of an NID includes setting the pause ability of the MAC, including storing MAC configuration information in a storage register of the NID.

15. The method for configuring network interface devices as in claim 14, wherein the MAC configuration information includes the pause ability of the MAC, and the storing of the MAC configuration information includes setting and disabling a negotiate pause ability (NPA) bit and a force pause ability (FPA) bit, the setting of the FPA bit enabling the pause ability of the MAC regardless of a pause ability state of the link partner of the corresponding PHY of the MAC, the setting of the NPA bit and non-setting of the FPA bit enabling the pause ability of the MAC only if the autonegotiation results indicate that the link partner of the corresponding PHY of the MAC supports pause ability, and non-setting of the NPA bit and the FPA bit disabling the pause ability of the MAC.

* * * * *